United States Patent

Voyatzakis et al.

[19]

[11] Patent Number: 5,783,222
[45] Date of Patent: Jul. 21, 1998

[54] DOUGH MOLDER

[75] Inventors: Andrew D. Voyatzakis; George Athanasiadis, both of Arlington, Mass.

[73] Assignee: Somerset Industries, Inc., N. Billerica, Mass.

[21] Appl. No.: 739,114

[22] Filed: Oct. 25, 1996

[51] Int. Cl.⁶ .......................... A21C 11/00; B29C 43/46; B29C 53/32

[52] U.S. Cl. .......................... 425/151; 425/215; 425/225; 425/320; 425/363; 425/364 R; 426/501; 426/502

[58] Field of Search ..................... 425/363, 364 R, 425/367, 371, 373, 374, 215, 218, 225, 320, 151; 426/500, 501, 502

[56] References Cited

U.S. PATENT DOCUMENTS

| | | | |
|---|---|---|---|
| 1,796,922 | 3/1931 | Eseman | 425/364 R |
| 2,907,285 | 10/1959 | Anetsberger | 425/364 R |
| 3,589,308 | 6/1971 | Verhoeven | 425/215 |
| 4,045,151 | 8/1977 | Zazzara | 425/364 R |
| 4,075,359 | 2/1978 | Thulin | 426/502 |
| 4,824,356 | 4/1989 | Benier | 426/502 |
| 5,143,735 | 9/1992 | Varvello et al. | 425/364 R |
| 5,605,708 | 2/1997 | Cummins et al. | 425/364 R |

*Primary Examiner*—Khanh P. Nguyen
*Attorney, Agent, or Firm*—Morse, Altman & Benson

[57] ABSTRACT

A dough molder including a stainless steel case, a sheeter, a former, a compressor, and a removable cleaning tray. The sheeter includes a fixed roller, adjustable roller, and a scraper for each roller, where the gap between the rollers is adjustable. The dough from the sheeter is directed to a conveyor belt that moves the dough to the former, a reticulated surface, such as a chain link screen, flexible in the direction of belt movement, that forms the dough into a roll. The belt directs the rolled dough from the former to the compressor that compresses the rolled dough into a cylindrical shape. The cleaning tray is located between the upper and lower legs of the belt, accumulating bits of flour and dough. The tray is removable for emptying.

15 Claims, 10 Drawing Sheets

DOUGH MOLDER

BACKGROUND OF THE INVENTION

FIELD OF THE INVENTION

The present invention relates to bakery machinery, more specifically, to apparatus for forming bread and pasta dough into sheets and molding the sheets into bread loaves.

THE PRIOR ART

Integrated machines for sheeting and molding bread dough have existed for a long time. Typically, the machines consist of a pair of rollers for sheeting, or flattening, the dough, a conveyor belt for transporting the dough sheet, a dough former for rolling the dough, and a pressure plate for compressing the dough roll. In order to reduce the footprint of the machine, the molding function and the compressing function are located on vertically opposed sides of the conveyor belt. The dough former is placed over the conveyor belt so that the upper belt portion moves the dough under the dough former and the pressure plate is placed under the conveyor belt so that the lower portion of the belt moves the dough roll above the plate. The entire mechanism is covered for safety reasons to prevent injury to persons working with the machine.

The disadvantage to this arrangement is that it is difficult to clean. As dough moves through the dough molder, flour and bits of dough come loose and fall from the sheeting rollers onto the conveyor belt and from the conveyor belt into the moving parts. Flour has extremely fine granules that, when combined with moisture from the air and the bits of dough, can easily obstruct the moving parts of the dough molder.

Preventing problems caused by flour and bits of dough require that the machine be cleaned after relatively short periods of time, for example, on a daily basis. This entails removing the sides of the machine to reach the conveyor belt mechanism, a time-consuming task, labor intensive, and, consequently, costly task.

SUMMARY OF THE INVENTION

The principal object of the present invention is to provide a machine for sheeting and rolling dough that is easier to clean than machines currently in use.

A further object is to provide a machine that can go for longer periods of time between cleaning that require that the machine be disassembled.

A still further object is to provide a machine with less maintenance time and that is less costly to keep clean than machines currently in use.

The dough molder of the present invention operates on a lump of dough by sheeting, or flattening, it and then rolling and compressing it into an approximately cylindrical shape.

The dough molder has an outer case, preferably composed of stainless steel. The interior of the case is divided into an operating compartment and a drive compartment. The operating compartment includes the sheeting, rolling, and compressing components. The sheeting components include a fixed roller, adjustable roller, and a scraper for each roller. The sheeting rollers are mounted horizontally and parallel to each other. Each sheeting roller has a hard, substantially cylindrical outer portion that rotates about a rigid shaft. The adjustable sheeting roller moves so that the gap between the sheeting rollers can be adjusted between approximately ⅛ inch and 1 inch in order to select the thickness to which the dough will be flattened. Round disks are attached to the ends of the adjustable roller shaft. The shaft is offset from the axis of the disk so that, when the disk is rotated about its axis by a handle, the adjustable roller shaft moves about an arc. The arc takes the adjustable roller nearer and farther from the fixed roller, adjusting the gap.

The outer portion of the sheeting rollers is preferably composed of a material to which the dough will adhere, but from which the dough can be easily removed. If the dough will not adhere, it cannot be forced through the sheeting roller gap. The scrapers remove the dough from the sheeting rollers if it sticks.

The sheeting rollers direct the dough onto a horizontal conveyor belt. The belt moves around two rollers, a drive roller and an idler roller. Preferably, the idler roller can be moved horizontally to adjust the tension of the belt.

The dough former is a flexible, reticulated surface, such as a chain link screen, that nominally rests on the upper leg of the belt. The dough former is flexible in the direction that the belt moves. The dough former is prevented from being dislocated by the belt preferably by a pair of flexible wires attached between the leading corners of the dough former and the side walls.

The dough guide is a curved sheet of stainless steel that directs the rolled dough from the dough former to the dough compressor. The dough guide is preferably adjustable so that different diameters of rolled dough can be accommodated.

The dough compressor is a combination the belt lower leg and a pressure plate. The pressure plate is a large flat surface that is supported below the belt lower leg. It is not precisely parallel to the belt; the distance between the belt and the pressure plate decreases from the dough guide to the dough exit so that the dough is compressed as the belt forces the rolled dough past the pressure plate. Preferably the distance between the pressure plate and the lower leg is adjustable to accommodate different size dough rolls. Preferably the pressure plate is removable for cleaning and inspection.

As dough moves through the dough molder, flour and bits of dough come loose and fall from the sheeting rollers onto the belt and from the belt, especially from around the dough former. The space between the upper and lower legs is high enough so that flour and bits of dough can land on the inside of the lower belt leg and be carried to other locations in the dough molder. These materials, if allowed to accumulate, will eventually obstruct the moving parts of the dough molder.

An essential aspect of the present invention is the inclusion of a cleaning tray in the space between the upper and lower legs. Preferably the tray has a width that is slightly less than the minimum distance between the belt rollers and a length that is substantially the width of the operating compartment. The tray slides into an opening in the side of the dough molder and is held in place by a pair of screws that can be finger-tightened. Optionally, there is at least one rail extending between the operating compartment walls upon which the tray rests when secured in position.

The drive motor is mounted so that the drive shaft is horizontal, parallel to the sheeting rollers, and extends into the drive compartment. There are a plurality of horizontal louvered slots in the rear wall for ventilation.

The drive compartment houses the chain drive. Each of the motor drive shaft, fixed sheeting roller, adjustable sheeting roller, and belt drive roller has a sprocket attached to its end within the drive compartment. A single continuous chain is used to drive all of the sprockets from the motor shaft sprocket. The chain is routed so that the sheeting rollers rotate in opposite directions to push the dough down between them onto the conveyor belt. In addition to the four primary sprockets, there are three fixed idler sprockets that merely route the chain as necessary and a tensioning idler sprocket. The tensioning idler sprocket is mounted at one end of a rotatably-mounted, spring-loaded, self-adjusting tensioning arm. As the adjustable sheeting roller and/or the belt idler roller is adjusted, the tensioning idler sprocket maintaining approximately the same tension on the chain.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

The dough molder 10 of the present invention operates on a lump of dough in two ways. First it sheets the dough, flattening it to a selected thickness. It then molds the sheet of dough by rolling it into a cylindrical shape and compressing the roll.

Figure 1:
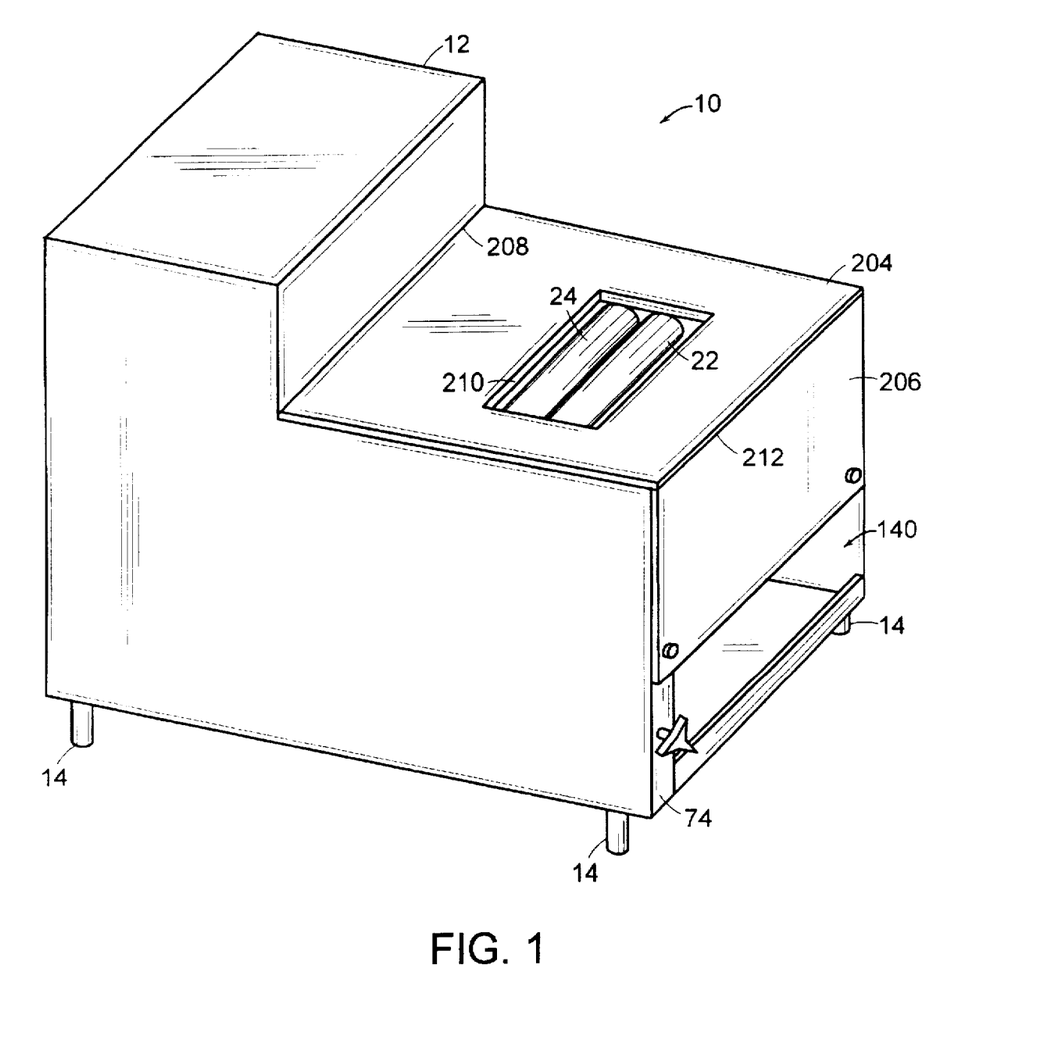
FIG. 1 is a front perspective view of the dough molder of the present invention.
Figure 2:
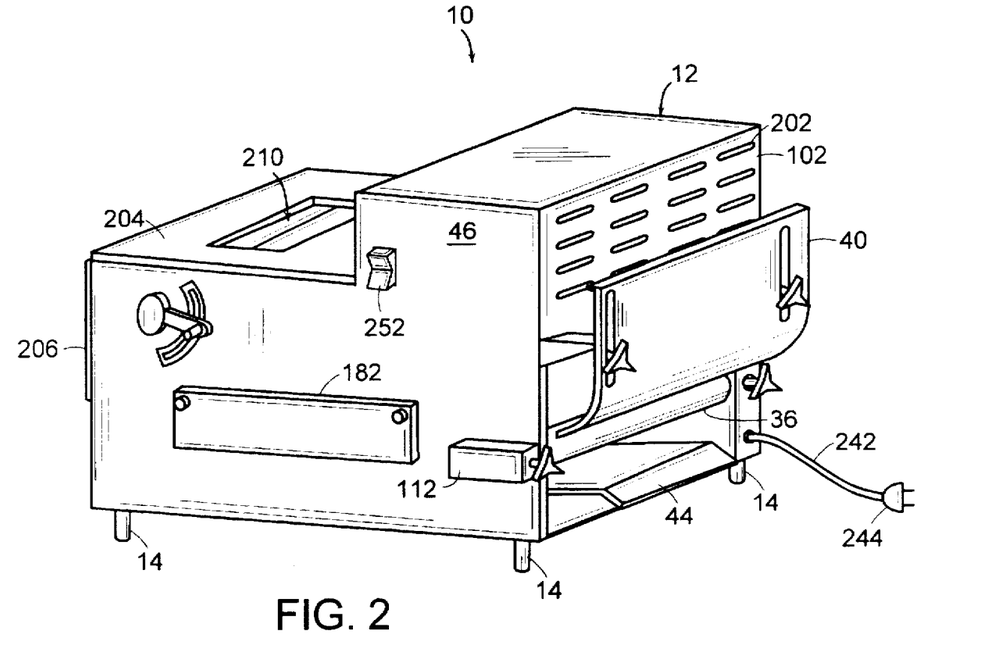
FIG. 2 is a rear perspective view of the dough molder of FIG. 1.

As shown in FIGS. 1 and 2, the case 12 preferably has a shortened L-shape when viewed from the side. The case 12 is preferably composed of stainless steel, because stainless steel is relatively easy to clean and it resists to rust and other corrosion. There are four feet 14 attached to the four bottom corners of the case 12. The interior of the case 12 is divided into two side-by-side compartments, the operating compartment 16 and the drive compartment 18, preferably by a stainless steel wall 48.

Figure 3:
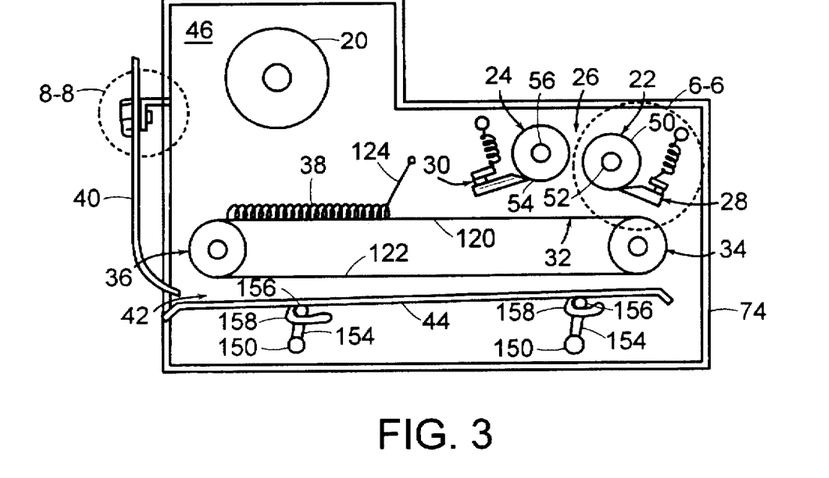
FIG. 3 is a left side, cross-sectional view of the dough molder of FIG. 1.

The main components housed within the operating compartment 16, as shown in cross section in FIG. 3, include the drive motor 20, a fixed sheeting roller 22, an adjustable sheeting roller 24, a pair of scrapers 28, 30, a conveyor belt 32, a belt drive roller 34, a belt idler roller 36, a dough former 38, a dough guide 40, and a dough compressor 42.

The two sheeting rollers 22, 24 are mounted horizontally between the two walls 46, 48 of the operating compartment 16. Each sheeting roller 22, 24 is substantially cylindrical. The fixed sheeting roller 22 is located near the top front of the operating compartment 16 and is oriented substantially parallel to the front wall 74 of the case 12. The fixed sheeting roller 22 has a rigid plastic outer portion 50 and a metal longitudinal shaft 52 about which the outer portion 50 rotates. One end of the shaft 52 is fixedly attached to the right wall 46, the wall opposite the drive compartment 18. The other end of the shaft 52 extends into the drive compartment 18, where it is fixedly attached.

The adjustable sheeting roller 24 also has a rigid plastic outer portion 54 with a metal longitudinal shaft 56 about which the outer portion 54 rotates. The adjustable sheeting roller 24 is located to the rear of and slightly above the fixed sheeting roller 22.

Figure 4:
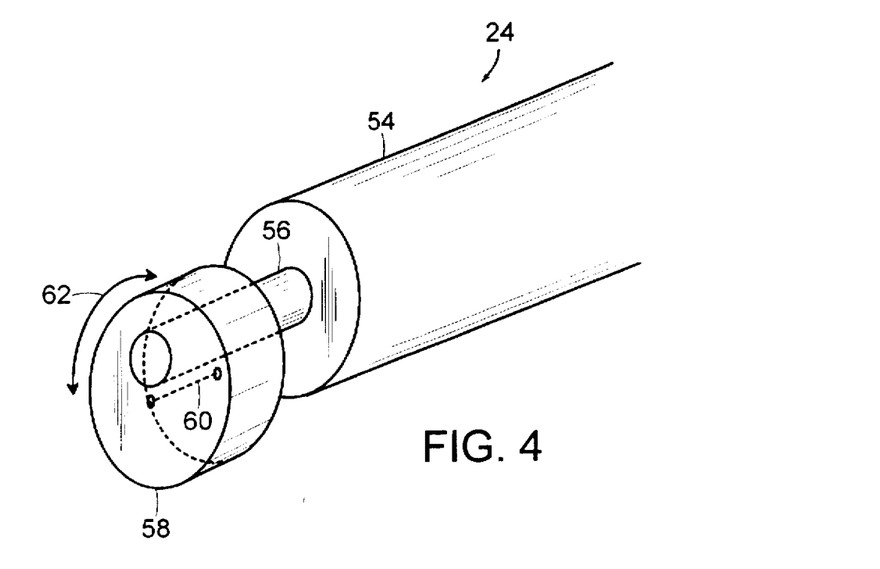
FIG. 4 is a perspective view in partial phantom of the adjustable sheeting roller mounting.

The adjustable sheeting roller 24 is mounted so that the gap 26 between the sheeting roller outer portions 50, 54 is adjustable between approximately 1/8 inch and 1 inch. As shown in FIG. 4, a round thick disk 58 is attached to each end of the shaft 56. The disk 58 has an axis 60 perpendicular to its faces, and is attached to the shaft 56 so that the axis of the shaft 56 is parallel to, but offset from, the disk axis 60. The disks 58 are held in stationary locations but are permitted to rotate. As the disks 58 rotate, the shaft 56 moves in an arc 62 about the disk axis 60, varying the size of the gap 26.

Figure 5:
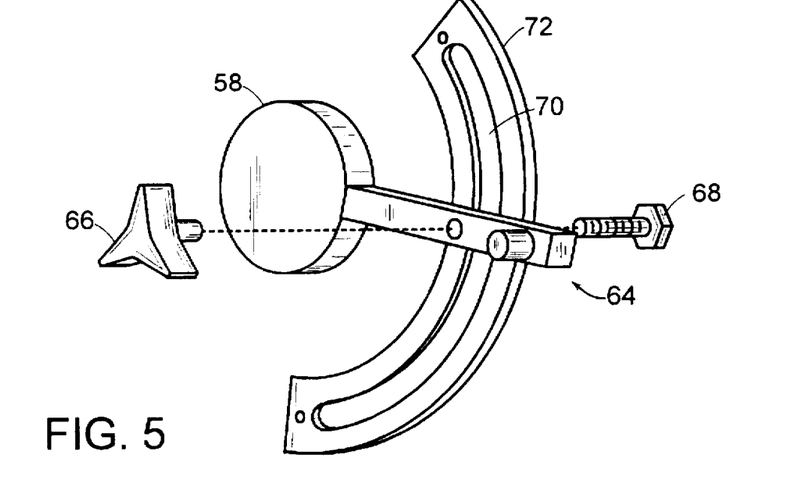
FIG. 5 is an exploded, perspective view of the sheeting roller gap adjuster handle.

The disks 58 are rotated by a handle 64 extending radially from the edge of the disk 58 at the right wall 46, as shown in FIG. 5. Preferably, the handle 64 can be secured by a knob 66 after the gap 26 is adjusted as desired. The knob 66 is threaded and turns onto a bolt 68 extending through a curved slot 70 in a curved plate 72 parallel to and spaced from the right wall 46. As the knob 66 is turned onto the bolt 68, friction prevents the handle 64 from being moved, thereby holding the gap 26 constant.

The sheeting roller outer portions 50, 54 are preferably composed of a material to which dough will adhere, but from which the dough can easily be removed. If the outer portions 50, 54 are not sticky enough, the dough will not adhere to the sheeting rollers 22, 24 enough to be pulled through the gap 26. If the outer portions 50, 54 are too sticky, the dough will not be easily removable, making the sheeter unable to perform its function.

Figure 6:
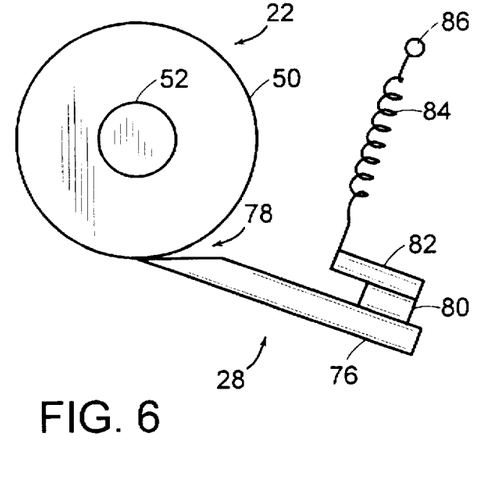
FIG. 6 is an enlarged view of section 6—6 of FIG. 3.

The scrapers 28, 30 remove the dough from the sheeting roller outer portions 50, 54 as it comes out of the gap 26. The scrapers 28, 30 are substantially identical. As shown in FIG. 6, each scraper 28, 30 includes a flat rigid plastic plank 76 that is approximately the same length as the sheeting rollers 22, 24 and that has a beveled scraping edge 78. Attached lengthwise near the rear edge of the plank 76 is a rod 80. The rod 80 is longer than the plank 76 and the ends of the rod 80 are pivotally mounted in the walls 46, 48 via bearings. Near each end of the rod 80 and extending toward the scraping edge 78 are a pair of ears 82.

The front scraper 28 is mounted in front of the fixed sheeting roller 22 and the rear scraper 30 is mounted behind the adjustable sheeting roller 24. Both are located so that the scraping edge 78 makes contact with the sheeting roller outer portion 50, 54 and oriented at an approximately 30° angle up from the horizontal. A spring 84 is connected between each ear 82 and a protrusion 86 from the side wall 46, 48 above the corresponding scraper 28, 30. The springs 84 pull the scraping edge 78 upward against the surface of the corresponding sheeting roller 22, 24.

The belt drive roller 34 is mounted between and perpendicular to the side walls 46, 48 below the fixed sheeting roller 22. It has a cylindrical rigid plastic outer portion 90 and a metal longitudinal shaft 92 about which the outer portion 90 rotates. One end of the shaft 92 is fixedly attached to the right wall 46. The other end of the shaft 92 extends into the drive compartment 18, where it is fixedly attached.

Figure 7:
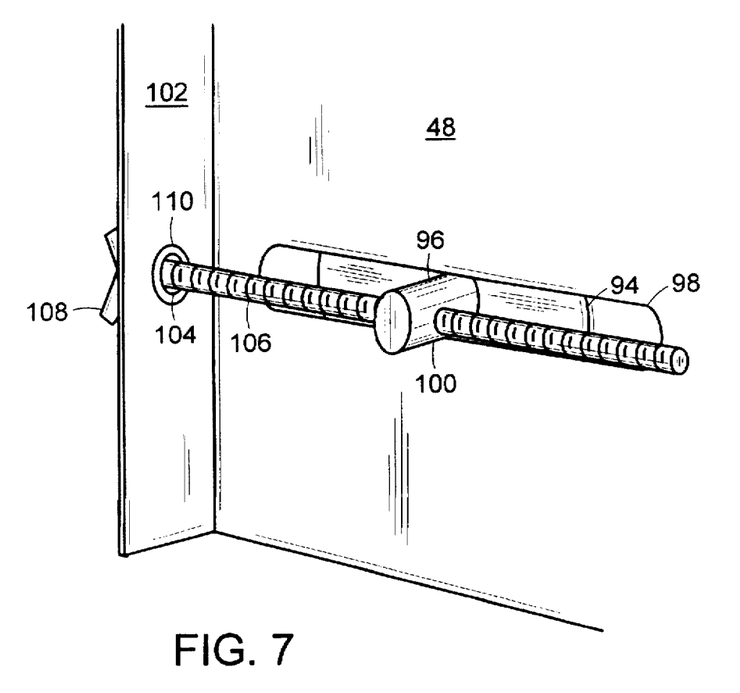
FIG. 7 is a perspective view of the adjustment mechanism of the belt idler roller.

The belt idler roller 36 is mounted between the side walls 46, 48 at the rear of the case 12 and parallel to the belt drive roller 34. It has a cylindrical rigid plastic outer portion 94 and a metal longitudinal shaft 96 about which the outer portion 94 rotates. As shown in FIG. 7, both ends of the shaft 96 extend through horizontal slots 98 in the side walls 46, 48.

Extending through a hole 104 in rear wall 102 of the drive compartment 18 is a threaded bolt 106 with a knob 108. The bolt 106 is captured in the hole 104 by a clip 110 so that it can rotate but not reciprocate within the hole 104. A similar mechanism exists on the right side, as seen in FIG. 2, where the bolt 106 is housed in a doghouse 112 extending from the right wall 46. The bolts 106 are turned into horizontal threaded holes 100 near each end of the belt idler roller shaft 96. As the bolts 106 are turned into and out of the threaded holes 100, the distance between the belt idler roller 36 and the belt drive roller 34 is adjusted.

The conveyor belt 32 extends around the belt drive roller 34 and the belt idler roller 36. The tension of the conveyor belt 32 is set by adjusting the distance between the belt rollers 34, 36, as described above.

The dough former 38 rests on the upper leg 120 of the conveyor belt 32 when no dough is being molded. It is a flexible reticulated surface, preferably a chain link screen surface, that is oriented such that it is flexible in the direction of the movement of the conveyor belt 32. The dough former 38 has approximately the same width as the belt 32. It is attached to the case 12 by a pair of flexible wires 124 between the leading corners of the dough former 38 and the side walls 46, 48. The flexible wires 124 are long enough so that the front edge of the dough former 38 can extend at least two inches above the belt upper leg 120. The rear of the dough former 38 is not attached to the case 12.

Figure 8:
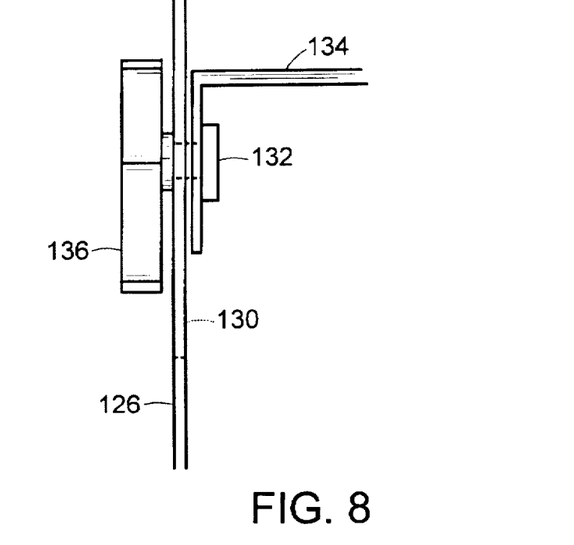
FIG. 8 is an enlarged view of section 8—8 of FIG. 3.

The dough guide 40 is located at the rear of the case 12, beyond the belt 32 and directs the rolled dough to the dough compressor 42. The dough guide 40 is preferably a stainless steel sheet that is has an upper flat portion 126 and a lower curved portion 128. The curved portion 128 curls around the belt idler roller 36, where there is enough horizontal distance from the belt 32 to permit dough exiting the dough former 38 to fit between the belt 32 and the dough guide 40. The flat portion 126 has a vertical slot 130 near each side edge. As in FIG. 8, a threaded bolt 132 extends from a flange 134 on the case 12 into the slot 130. The dough guide 40 is secured by a hand-tightened knob 136 turned onto the bolt 132.

The dough compressor is a combination of a pressure plate 44 and the belt lower leg 122. The pressure plate 44 is a large flat surface that is supported below the belt lower leg 122. The sides of the pressure plate 44 curl upwardly toward the belt 32 so that the rolled dough is kept centered on pressure plate 44 and does not skew to the side and fall off the pressure plate 44. The pressure plate 44 is not precisely parallel to the belt 32; the distance between the belt 32 and the pressure plate 44 decreases from the dough guide 40 to the dough exit 140.

Figure 9:
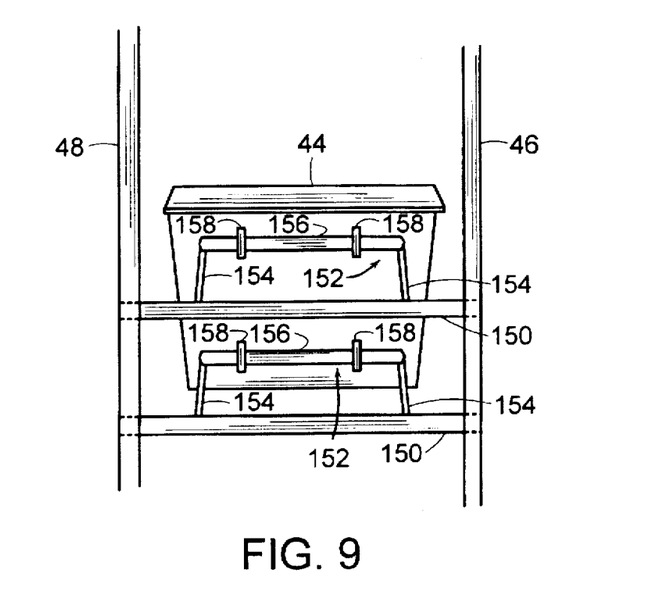
FIG. 9 is a bottom front perspective view of the pressure plate adjustment mechanism.

The distance between the pressure plate 44 and the belt lower leg 122 is preferably adjustable to enable use with different size dough rolls. To facilitate adjustment, the pressure plate 44 is supported by a pair of rotatably mounted shafts 150 between the side walls 46, 48 and a pair of inverted U-shaped brackets 152 connecting each shaft 150 to the pressure plate 44, as shown in FIGS. 3 and 9. The ends of the bracket legs 154 are fixedly attached to the shafts 150 and the cylindrical cross bar 156 of the bracket 152 is rotatably attached to the pressure plate 44. The attachment to the pressure plate 44 is accomplished by using a pair of hooks 158 that extend horizontally from the bottom of the pressure plate 44. The hooks 158 snap around and loosely latch onto the cross bar 156. This snap-in connection facilitates the easy removal of the pressure plate 44 for cleaning and inspection.

Figure 11:
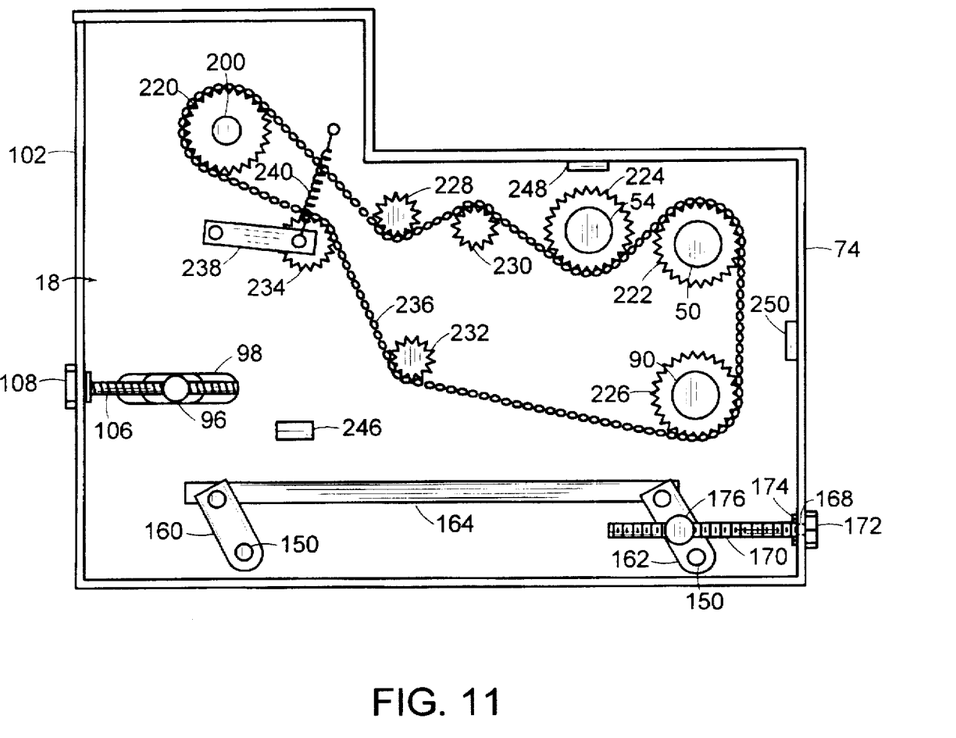
FIG. 11 is a side view of the drive compartment with the cover removed.
Figure 12:
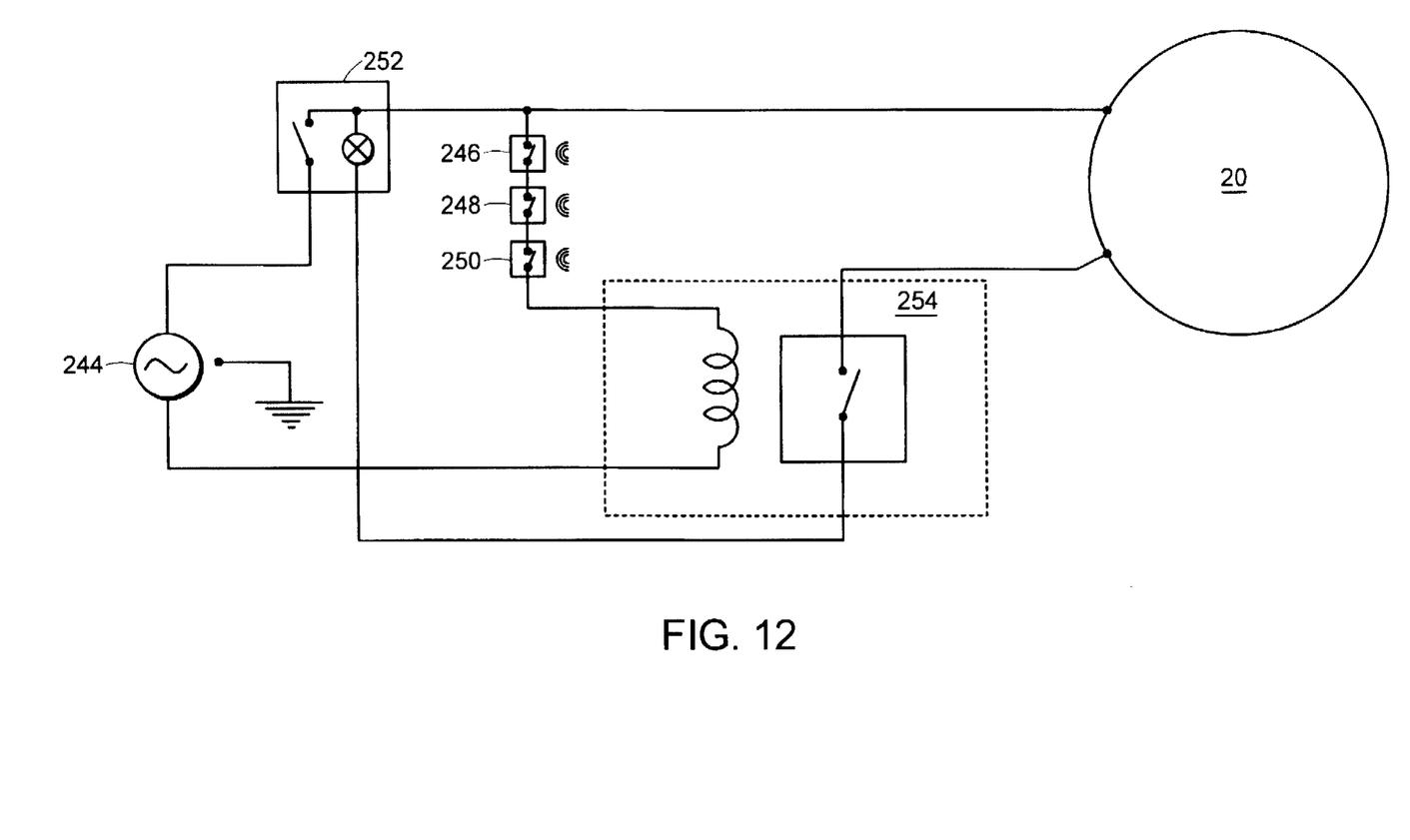
FIG. 12 is an electrical schematic of the present invention.

As shown in FIG. 11, one end of each shaft 150 extends into the drive compartment 18, where an arm 160, 162 extends perpendicularly from the shaft 150. A rigid link 164 rotatably connects the two arms 160, 162 so that the shafts 150 rotate in unison. The front arm 162 has a horizontal threaded hole 166 through a rotatably-mounted ear 176. Extending through a hole 168 in the front wall 74 of the drive compartment 22 is a threaded bolt 170 with a knob 172. The bolt 170 is captured in the hole 168 by a clip 174 so that it can rotate but not reciprocate within the hole 168. The bolt 170 is turned into the threaded hole 166 in the front arm 162. As the bolt 168 is turned into and out of the threaded hole 166, the arms 160, 162 rotate the shafts 150, varying the distance between the pressure plate 44 and the belt 32.

As dough moves through the dough molder 10, flour and bits of dough come loose and fall from the sheeting rollers 22, 24 onto the conveyor belt 32 and from the conveyor belt 32, especially from around the dough former 38. There is a large space 180 between the belt upper leg 120 and lower leg 122. The space 180 is high enough so that flour and bits of dough can land on the inside of the lower belt leg 122 and be carried to other locations in the dough molder 10. These materials, if allowed to accumulate, will eventually obstruct the moving parts of the dough molder 10.

Figure 10:
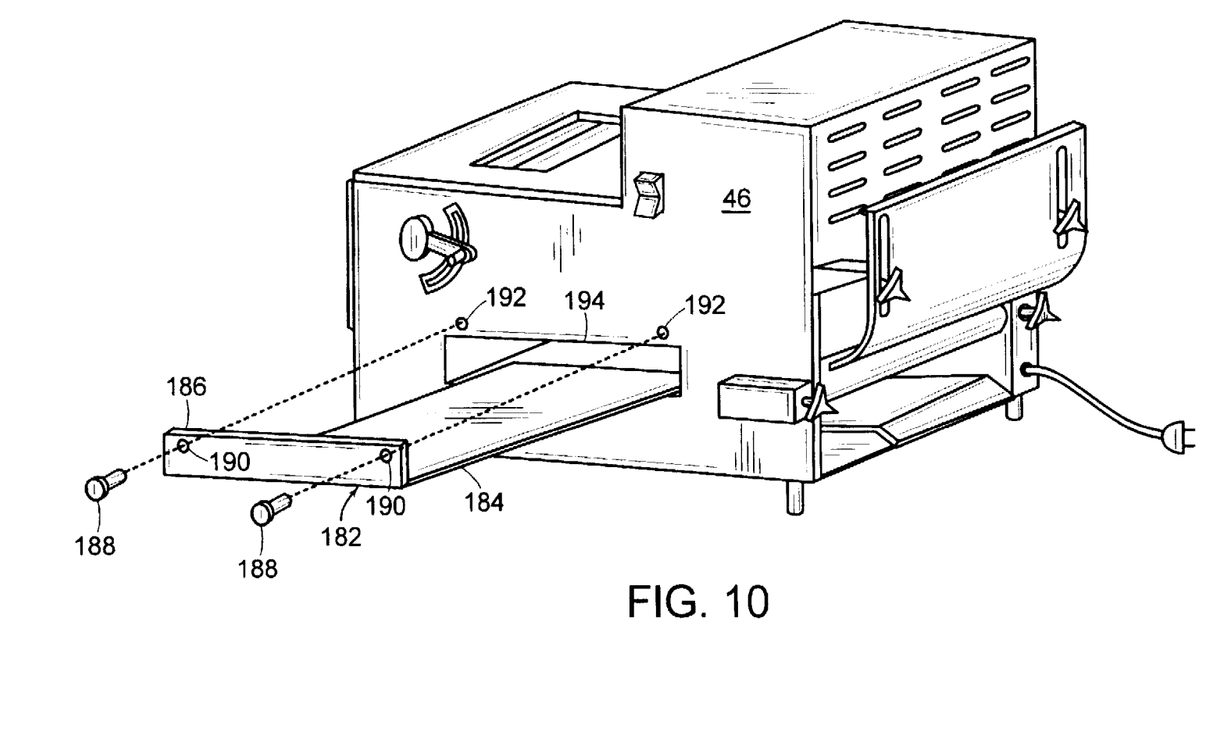
FIG. 10 is a perspective view of the present invention with the cleaning tray partially removed.

An essential aspect of the present invention is the inclusion of a cleaning tray 182 in the space 180 between the upper leg 120 and lower leg 122 of the conveyor belt 32. As shown in FIG. 10, the tray 182 has a bottom 184 that is preferably a flat sheet of stainless steel having a length that is slightly less than the minimum distance between the belt rollers 34, 36 and a width that is substantially the width of the operating compartment 16. A tray wall 186 extends perpendicularly upward from a side edge of the tray bottom 184. The tray 182 slides into an opening 194 in the right side 46 between the upper leg 120 and lower leg 122. The tray 182 is preferably secured in position by a pair of finger-tightened screws 188 that extend through holes 190 in the tray wall 186 and into threaded holes 192 in the right wall 46. The screws 188 hold the tray bottom 184 above the belt lower leg 122 so as to prevent obstructing the movement of the belt 32. Optionally, there is at least one rail extending between the walls 46, 48 upon which the tray 182 rests when secured in position.

The drive motor 20 is housed within the upwardly extending portion of the case 12. The motor 20 is mounted such that the motor drive shaft 200 is horizontal and substantially parallel to the sheeting rollers 22, 24. The end of the drive shaft 200 extends into the drive compartment 18. For ventilation, the rear wall 102 adjacent to the motor 20 has a plurality of horizontal louvered slots 202.

The operating compartment 16 has a top cover 204 and a front cover 206, both of which are preferably composed of a transparent plastic sheet. Both covers 204, 206 are hinged to provide access to the sheeting rollers 22, 24. Access is necessary in order to periodically inspect the dough molder 10 easily and efficiently to determine if it meets local sanitary codes. The top cover 204 extends from the hinge 208 at the crook of the L shape to the front of the case 12. It has an opening 210 directly above the gap 26 between the rollers 22, 24 into which the dough to be sheeted is inserted. The front cover 206 extends down from the hinge 212 at top front edge of the case 12 to approximately the belt drive roller 34. The opening 140 below the front cover 206 is where the molded dough exits from the dough compressor.

The drive compartment 18 houses the chain drive. The motor drive shaft 200 extends into the drive compartment 18 and has a sprocket 220 attached to the end. The fixed sheeting roller outer portion 50 has a sprocket 222 attached to its end, the adjustable sheeting roller outer portion 54 has a sprocket 224 attached to its end, and the belt drive roller outer portion 90 has a sprocket 226 attached to its end. In addition to these four sprockets 220, 222, 224, 226, there are three fixed idler sprockets 228, 230, 232 and a tensioning idler sprocket 234. A single continuous chain 236, such as a bicycle chain, is used to drive all of the sprockets from the motor shaft sprocket 220. The fixed idler sprockets 228, 230, 232 merely route the chain 236 as necessary between the other sprockets. The chain 236 is routed such that the fixed sheeting roller 22 and the adjustable sheeting roller 24 rotate in opposite directions to push the dough down between them onto the conveyor belt 32. The tensioning idler sprocket 234 is mounted at one end of a self-adjusting tensioning arm 238, the other end of which is rotatably attached to the wall 48. The tensioning arm 238 is pulled toward the chain 236 by a spring 240. As the adjustable sheeting roller 24 and/or the belt idler roller 36 is adjusted, the length of the chain 236 would ordinarily need to be changed because the length of the path traversed by the chain 236 changes. By using a self-adjusting tensioning arm 238, the chain 236 can remain a fixed length while maintaining approximately the same tension throughout the entire range of the roller adjustments.

An electrical schematic of the dough molder 10 is shown in FIG. 11. The motor 20 is preferably powered by 120 VAC at 60 Hz. Alternatively, the motor 20 is powered by 240 VAC at 50 Hz. The appropriate power cord 242 and plug 244 for the local power exits from the rear wall 102 of the machine 10 and plugs into a wall outlet. Preferably, there are three magnetic safety switches 246, 248, 250 that prevent the motor 20 from operating unless the covers 204, 206 and cleaning tray 182 are in place. The operator turns on the dough molder 10 by a power switch 252 located on the right wall 46. A relay 254 transfers power from the wall plug 244 to the motor 20.

OPERATION

Figure 13:
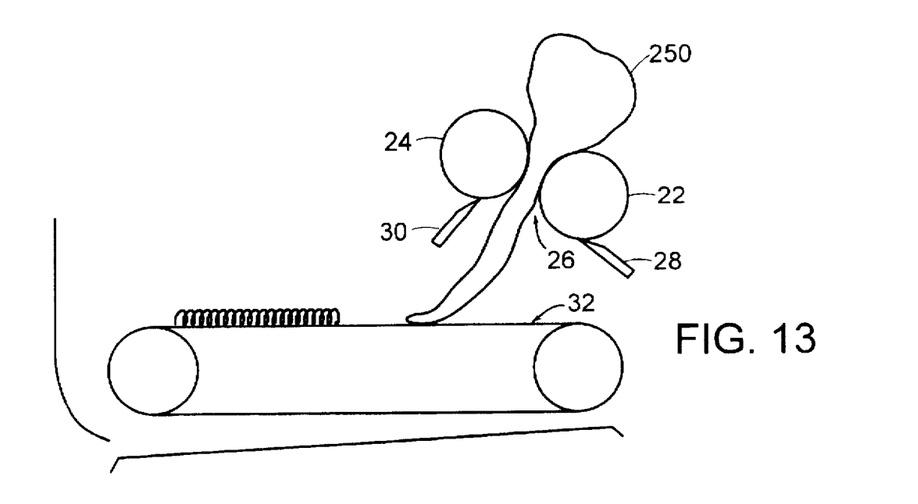
FIGS. 13–17 are cross-sectional views showing the operation of the dough molder of the present invention.
Figure 14:
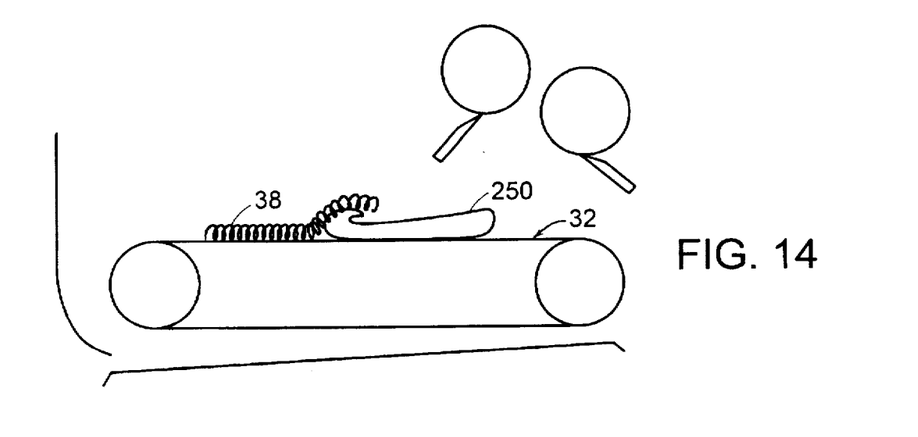
Figure 15:
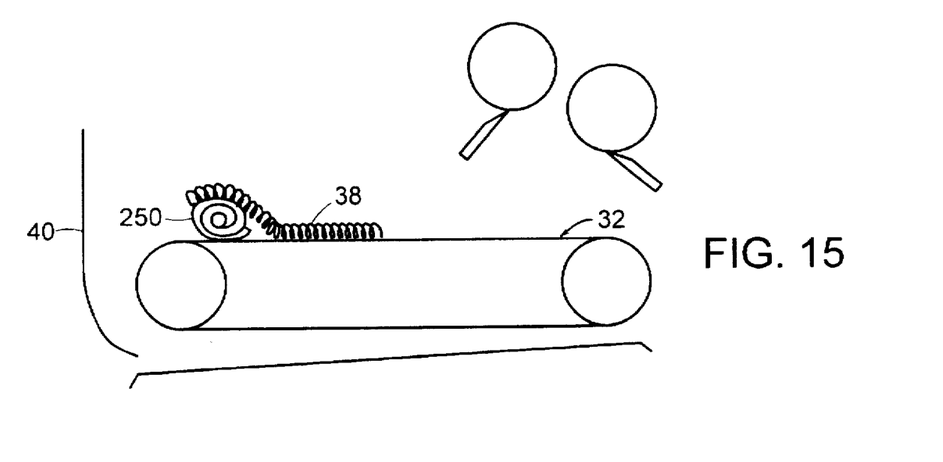
Figure 16:
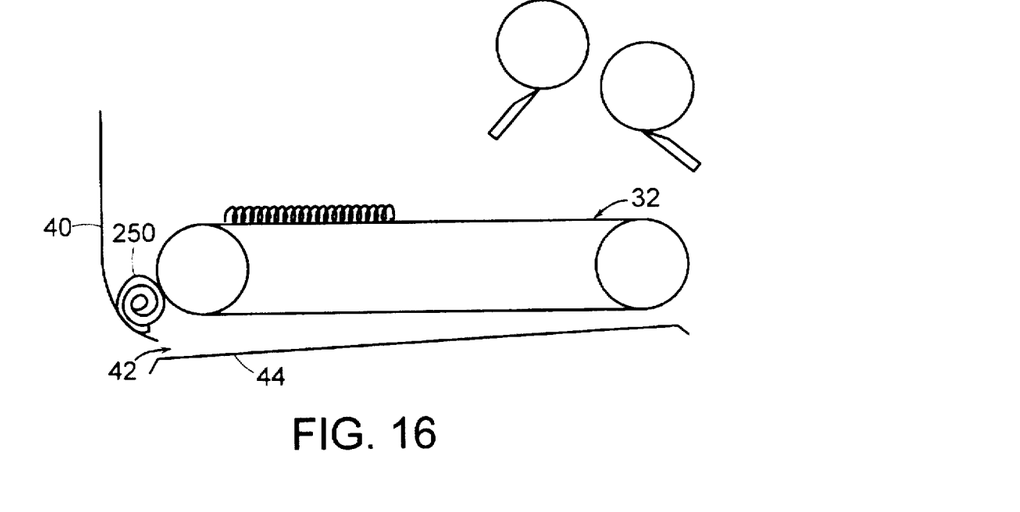
Figure 17:
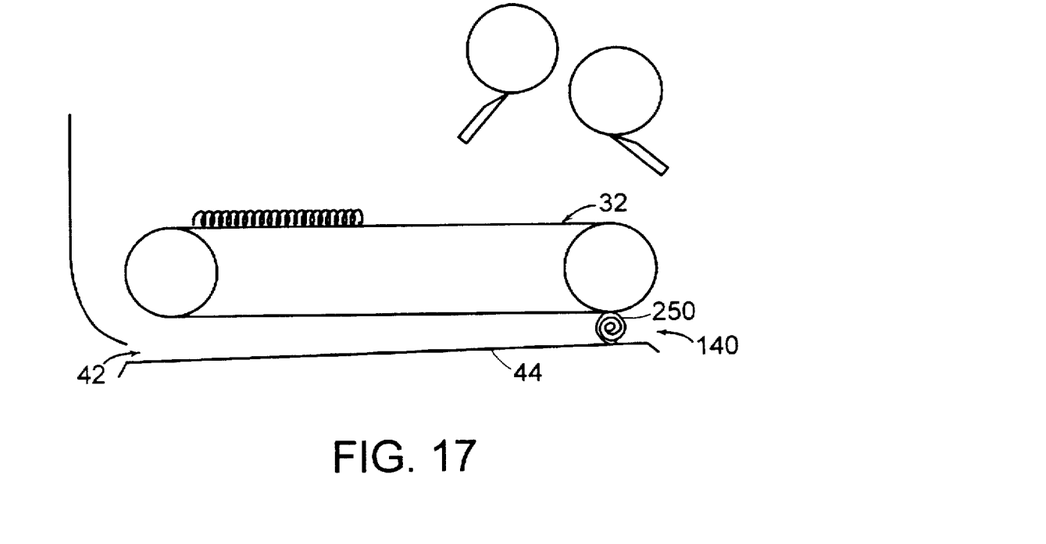

The dough molder 10 is plugged into a wall socket and turned on at the power switch 252, after making sure that the covers 204, 206 are closed and the cleaning tray 182 is in place. A lump of dough 250 is inserted into the opening 210 in the top cover 204. As the sheeting rollers 22, 24 rotate, they pull the dough 250 through the gap 26 between them, as in FIG. 13. The dough coming out of the gap 26 is a flat sheet having a thickness determined by the adjustment of the adjustable sheeting roller 24. The dough sheet 250 makes contact with the conveyor belt 32, which then transports the dough sheet 250 to an encounter with the front edge of the dough former 38. The dough former 38 causes the front edge of the dough sheet 250 to curl upward, as in FIG. 14. As the dough sheet 250 continues along the conveyor belt 32, the dough former 38 continues to act upon it, resulting in the dough sheet 250 being rolled into a loose cylindrical shape as it exits from the rear of the dough former 38, as at FIG. 15. The dough roll 250 is then carried to the dough guide 40, which guides the dough roll 250 onto the pressure plate 44, as in FIG. 14, which presses the dough roll 250 against the belt lower leg 122 until substantially all of the air is removed from the dough roll 250 and the dough is formed into a tight cylindrical shape, as in FIG. 16. The molded dough exits from the dough exit 140 below the front cover 206.

Thus it has been shown and described a dough molder which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A dough molder for molding an irregular lump of dough into a compressed approximately cylindrical shape, said dough molder comprising:
    (a) a sheeter for flattening said dough, said sheeter including a pair of parallel sheeting rollers that rotate in opposite directions, each of said sheeting rollers having an outer surface;
    (b) a gap between said sheeting rollers through which said dough moves;
    (c) a continuous conveyor belt onto which said dough is directed by said sheeting rollers, the movement of said belt being directed by a belt drive roller and a belt idler roller, said belt drive roller driving said belt approximately horizontally, said belt drive roller and said belt idler roller dividing said belt into an upper leg and a lower leg, said legs being substantially parallel to each other and moving in opposite directions;
    (d) a dough former for rolling said dough while being transported by said belt;
    (e) a dough compressor for compressing said dough after being rolled by said dough former; and
    (f) a removable cleaning tray between said upper and lower legs.

2. The dough molder of claim 1 wherein said gap is adjustable by moving one of said sheeting rollers relative to the other of said sheeting rollers.

3. The dough molder of claim 1 wherein at least one of said sheeting rollers has a scraper for removing said dough from said sheeting roller outer surface.

4. The dough molder of claim 1 wherein said dough former is a reticulated surface that is flexible in the direction of movement of said upper leg and wherein said dough is propelled by said upper leg between said reticulated surface and said upper leg.

5. The dough molder of claim 4 wherein said reticulated surface is a chain link screen.

6. The dough molder of claim 1 wherein a dough guide directs said dough from said dough former to said dough compressor.

7. The dough molder of claim 1 wherein said dough compressor includes a pressure plate having an approximately flat surface that extends approximately the length of said lower leg and that is mounted below said lower leg such that said dough is propelled by said lower leg between said flat surface and said lower leg from an ingress to an egress, the distance between said flat surface and said lower leg being greater at said ingress than at said egress.

8. The dough molder of claim 7 wherein the distance between said pressure plate and said lower leg is adjustable.

9. The dough molder of claim 7 wherein said pressure plate is removable.

10. The dough molder of claim 1 wherein said cleaning tray has a width that is at least as wide as said belt and a length that is slightly less than the distance between said belt driver roller and said belt idler roller.

11. The dough molder of claim 1 wherein a safety switch prevents operation of said dough molder when said cleaning tray is not installed in said dough molder.

12. The dough molder of claim 1 wherein said dough molder includes an electric motor for driving said sheeter and said belt.

13. A dough molder for molding an irregular lump of dough into a compressed approximately cylindrical shape, said dough molder comprising:

(a) a sheeter for flattening said dough, said sheeter including a pair of parallel sheeting rollers that rotate in opposite directions, each of said sheeting rollers having an outer surface and a scraper for removing said dough from said sheeting roller outer surfaces;

(b) a gap between said sheeting rollers through which said dough moves, said gap being adjustable by moving one of said sheeting rollers relative to the other of said sheeting rollers.

(c) a continuous conveyor belt onto which said dough is directed by said sheeting rollers, the movement of said belt being directed by a belt drive roller and a belt idler roller, said belt drive roller driving said belt approximately horizontally, said belt drive roller and said belt idler roller dividing said belt into an upper leg and a lower leg, said legs being substantially parallel to each other and moving in opposite directions;

(d) a dough former for rolling said dough being transported by said belt, said dough former being a chain link screen that is flexible in the direction of movement of said upper leg and said dough being propelled by said upper leg between said screen and said upper leg;

(e) a dough compressor for compressing said dough after being rolled by said dough former, said dough compressor including a removable pressure plate having an approximately flat surface that extends approximately the length of said lower leg and that is mounted below said lower leg such that said dough is propelled by said lower leg between said flat surface and said lower leg from an ingress to an egress, the distance between said flat surface and said lower leg being greater at said ingress than at said egress, the distance between said flat surface and said lower leg being adjustable;

(f) a dough guide for directing said dough from said dough former to said dough compressor;

(g) a removable cleaning tray between said upper and lower legs; and (h) an electric motor for driving said sheeter and said belt.

14. The dough molder of claim 13 wherein said cleaning tray has a width that is at least as wide as said belt and a length that is slightly less than the distance between said belt driver roller and said belt idler roller.

15. The dough molder of claim 13 wherein a safety switch prevents operation of said dough molder when said cleaning tray is not installed in said dough molder.

* * * * *